(12) United States Patent
Hadano et al.

(10) Patent No.: US 11,336,810 B2
(45) Date of Patent: May 17, 2022

(54) MOVING OBJECT, CONTROL METHOD, AND NON-TRANSITORY STORAGE MEDIUM

(71) Applicant: TOYOTA JIDOSHA KABUSHIKI KAISHA, Toyota (JP)

(72) Inventors: Hiroyasu Hadano, Toyota (JP); Yusuke Kaneko, Toyota (JP); Jun Goto, Toyota (JP); Hiroko Tsujimura, Gifu (JP); Miho Otsuka, Nagoya (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 16/538,266

(22) Filed: Aug. 12, 2019

(65) Prior Publication Data

US 2020/0053264 A1   Feb. 13, 2020

(30) Foreign Application Priority Data

Aug. 10, 2018   (JP) .............................. JP2018-151663

(51) Int. Cl.
H04N 5/232 (2006.01)
G06F 21/62 (2013.01)
G06Q 30/02 (2012.01)
H04N 5/225 (2006.01)

(52) U.S. Cl.
CPC ......... *H04N 5/232* (2013.01); *G06F 21/6218* (2013.01); *G06Q 30/0267* (2013.01); *H04N 5/2253* (2013.01)

(58) Field of Classification Search
CPC .................................................... G06Q 30/02

USPC .............................................. 705/14.1, 14.64
See application file for complete search history.

(56) References Cited

U.S. PATENT DOCUMENTS

| | | | |
|---|---|---|---|
| 10,142,496 B1 * | 11/2018 | Rao .................... | H04N 1/00244 |
| 2005/0085242 A1 * | 4/2005 | Nishizawa ............ | G08G 1/123 |
| | | | 455/456.3 |
| 2009/0125226 A1 * | 5/2009 | Laumeyer .............. | G06Q 30/02 |
| | | | 701/523 |

(Continued)

FOREIGN PATENT DOCUMENTS

| | | |
|---|---|---|
| CN | 104063911 A | 9/2014 |
| CN | 105761101 A | 7/2016 |

(Continued)

OTHER PUBLICATIONS

A_Location_Based_Advertisement_scheme_using_OpenStreetMap (Year: 2012).*

(Continued)

*Primary Examiner* — Gautam Ubale
(74) *Attorney, Agent, or Firm* — Oliff PLC

(57) ABSTRACT

A moving object includes: a holder configured to hold a mobile terminal provided with an image pick-up unit; and a controller comprising at least one processor configured to execute enabling the moving object to be used in cases where user authentication is succeeded by carrying out user authentication between the mobile terminal and the controller, instructing the mobile terminal to pick up an image in a repeated manner by using the image pick-up unit during use of the moving object, and transmitting the image obtained from the mobile terminal to an external server.

7 Claims, 6 Drawing Sheets

(56) References Cited

U.S. PATENT DOCUMENTS

| | | | | |
|---|---|---|---|---|
| 2015/0332328 A1* | 11/2015 | Kim | ............... | H04N 21/4223 |
| | | | | 705/14.58 |
| 2018/0375959 A1* | 12/2018 | Greene | ............... | H04L 67/32 |
| 2019/0218081 A1* | 7/2019 | High | ............... | A47F 3/08 |
| 2021/0110433 A1* | 4/2021 | Lim | ............... | H04W 4/185 |

FOREIGN PATENT DOCUMENTS

| | | | | | |
|---|---|---|---|---|---|
| CN | 107323593 A | | 11/2017 | | |
| JP | H09-114755 A | | 5/1997 | | |
| JP | 2005-173784 A | | 6/2005 | | |
| JP | 2008-298902 A | | 12/2008 | | |
| JP | 2012-094042 A | | 5/2012 | | |
| JP | 2015-060452 A | | 3/2015 | | |
| JP | 2018-049541 A | | 3/2018 | | |
| JP | 2018092385 A | * | 6/2018 | ............ | G06Q 30/02 |

OTHER PUBLICATIONS

Location_based_mobile_advertising_framework_for_commuters (Year: 2015).*

Towards_a_multi-screen_interactive_ad_delivery_platform (Year: 2017).*

* cited by examiner

MOVING OBJECT, CONTROL METHOD, AND NON-TRANSITORY STORAGE MEDIUM

CROSS REFERENCE TO THE RELATED APPLICATION

This application claims the benefit of Japanese Patent Application No. 2018-151663, filed on Aug. 10, 2018, which is hereby incorporated by reference herein in its entirety.

BACKGROUND

Technical Field

The present disclosure relates to a moving object, a control method, and a non-transitory storage medium.

Description of the Related Art

In patent literature 1, there is disclosed an electronic display device which is configured to obtain, from a distribution server, advertisement display information with which advertising condition information such as a position, a time point and so on is correlated, and to display advertisement information which matches the advertising condition information.

In patent literature 2, there is disclosed an information charging system for discounting a part of fee so as to promote the use and circulation of information by displaying an advertisement at the time of using the information.

In patent literature 3, there is disclosed that a user is provided with additional information which becomes a motivation for continuous use of a rented moving object.

In patent literature 4, there is disclosed a baby carriage or stroller which timely presents an optimum advertisement display according to the attribute of a child.

CITATION LIST

Patent Literature

Patent Literature 1: Japanese patent application laid-open publication No. 2008-298902
Patent Literature 2: Japanese patent application laid-open publication No. H09-114755
Patent Literature 3: Japanese patent application laid-open publication No. 2012-094042
Patent Literature 4: Japanese patent application laid-open publication No. 2018-049541

SUMMARY

The present disclosure has for its object to provide a technique for promoting the use of a moving object and the obtainment of data on a surrounding situation using the moving object.

A first aspect of the present disclosure may reside in a moving object comprising:
a holder configured to hold a mobile terminal provided with an image pick-up unit; and
a controller comprising at least one processor configured to execute
enabling the moving object to be used in cases where user authentication is succeeded by carrying out user authentication between the mobile terminal and the controller,
instructing the mobile terminal to pick up an image in a repeated manner by using the image pick-up unit during use of the moving object, and
transmitting the image obtained from the mobile terminal to an external server.

A second aspect of the present disclosure may reside in a control method for a moving object which is performed by a computer, the method comprising:
enabling the moving object to be used in cases where user authentication is succeeded by carrying out user authentication between a mobile terminal of a user and the computer;
instructing the mobile terminal to pick up an image in a repeated manner by using an image pick-up unit provided by the mobile terminal during use of the moving object; and
transmitting the image obtained from the mobile terminal to an external server.

A third aspect of the present disclosure may reside in a non-transitory storage medium which stores a program for causing a computer to execute a control method for a moving object, the program being configured to cause a computer to execute:
enabling the moving object to be used in cases where user authentication is succeeded by carrying out user authentication between a mobile terminal of a user and the computer;
instructing the mobile terminal to pick up an image in a repeated manner by using an image pick-up unit provided by the mobile terminal during use of the moving object; and
transmitting the image obtained from the mobile terminal to an external server.

According to the present disclosure, it is possible to promote the use of a moving object and the obtainment of data on a surrounding situation using the moving object.

DESCRIPTION OF THE EMBODIMENTS

Figure 1:
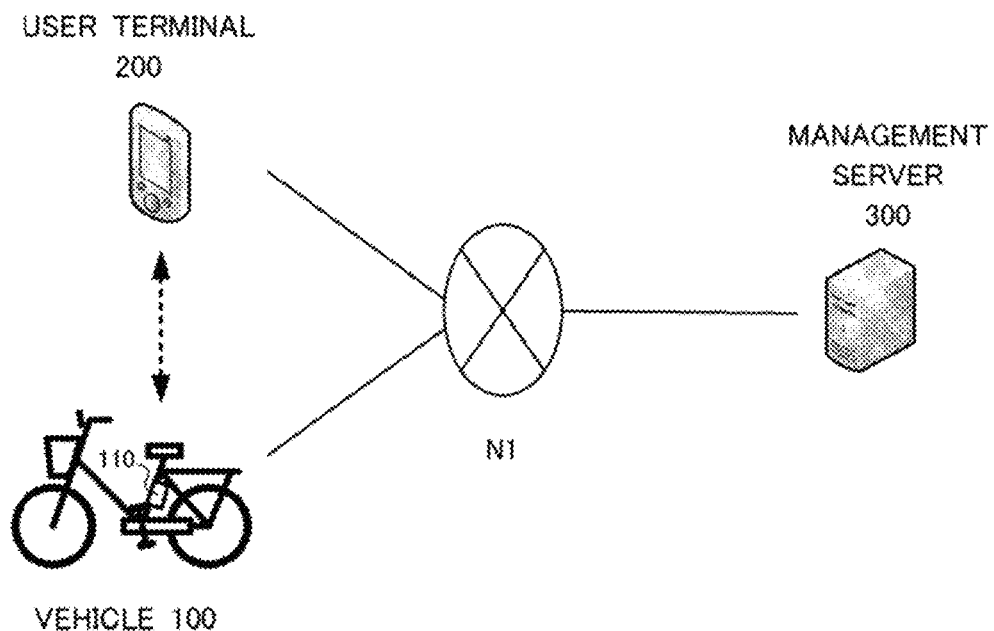
FIG. 1 is a schematic view of a bicycle sharing system according to one embodiment of the present disclosure.

In recent years, car sharing and bicycle sharing are spreading. In addition, a moving (movable) object such as a vehicle is also used as a sensor (probe car). In this disclosure, in view of such circumstances, it is intended to promote both the use of a moving object, and the obtainment of data on a surrounding situation using the moving object.

The moving object according to this embodiment may be provided with a holder and a controller. The holder may serve to hold a mobile terminal provided with an image pick-up unit. The image pick-up unit of the mobile terminal may be arranged for example on a surface opposite to an image display unit, and the holder may hold the mobile terminal in such a manner that the image pick-up unit faces to the front of the moving object and the image display unit faces to a user (driver). The controller may execute: (1) enabling the moving object to be used in cases where user authentication is succeeded by carrying out user authentication between itself and the mobile terminal; (2) instructing the mobile terminal to pick up an image in a repeated manner by using the image pick-up unit during use of the moving object, and (3) transmitting the image obtained from the mobile terminal to an external server. The controller may also obtain user authentication information by performing communication with the mobile terminal, and enable the moving object to be used, when it can be confirmed that the user is a user who has the use right of the moving object. An example of processing to enable the moving object to be used may be to unlock a lock of the moving object. The picking up of an image during use of the moving object may be carried out at an arbitrary interval. In addition, the transmission of the picked-up image to the external server may also be carried out at an arbitrary timing.

According to this embodiment, the user becomes able to use the moving object in return for permitting the use of the image pick-up unit of the mobile terminal in order to pick up a surrounding image. On the other hand, an administrator of the moving object can collect surrounding image data during the use of the moving object.

The controller in this embodiment may further execute obtaining permission of the user for picking up images with the use of the image pick-up unit, and may enable the moving object to be used, in cases where the user authentication is succeeded and the permission of the user for picking up an image is obtained. Here, note that in cases where the permission for picking up an image is not obtained, the moving object may be made unavailable, and even if the image pick-up permission is not obtained, in cases where an additional condition other than that is satisfied, the moving object may also be made available. For example, the controller may enable the moving object to be used, in cases where the user has agreed to pay expenses.

According to such a configuration, it is possible to prevent picking up of an image by using the mobile terminal of the user, without obtaining a user's consent.

The controller in this embodiment may further execute obtaining location information on a position at which the image has been picked up by using the image pick-up unit of the mobile terminal, and may also transmit the location information on the position at which the image has been picked up, together with the image, when transmitting the image to the external server.

According to such a configuration, the external server can grasp which position the picked-up image is information about.

The controller in this embodiment may further execute outputting an advertisement from an output unit provided by the mobile terminal. The output unit may also include at least either of the image display unit and a sound reproduction unit. In other words, the advertisement may be displayed as image or character, or may be reproduced as sound or voice.

According to such a configuration, the user can get useful information from the advertisement. In addition, the administrator of the moving object can get an advertising fee from an advertiser by providing the advertisement.

The controller in this embodiment may execute obtaining an attribute of the user of the mobile terminal, and deciding the content of the advertisement to be outputted according to the attribute of the user. Here, note that the decision of the advertising content may be made in consideration of not only the attribute of the user but also other elements such as, for example, a position, a time point, and the like.

According to such a configuration, it is possible to present a suitable advertisement according to the attribute of the user, thereby making it possible to enhance advertising effects to a more extent.

First Embodiment (System Outline)

This first embodiment is applied to a sharing system for bicycles. In this system, a user can use a bicycle for free when agrees to pick up a surrounding image by using a user terminal during use of the bicycle.

FIG. 1 is a view illustrating the schematic construction of a sharing system 1 according to this embodiment. In an example of FIG. 1, the sharing system 1 includes an on-board device 110 mounted on a vehicle (bicycle) 100, a user terminal 200 which is a personal digital assistant (mobile terminal) which is possessed by a using person (user), and a management server 300. The on-board device 110, the user terminal 200 and the management server 300 are mutually connected to one another by means of a network N1. In FIG. 1, the vehicle 100 and the user terminal 200 are illustrated, one for each of them, but there may be a plurality of vehicles and user terminals, respectfully.

The user installs an application program (hereinafter, referred to simply as app) for using the sharing system in the user terminal 200, and makes an application for use of the vehicle 100, etc., by using this app. The user sets the user terminal 200 in a terminal holding portion (terminal holder) 101 of the vehicle 100 during use of the vehicle 100. The user terminal 200 carries out picking up an image in a periodic manner according to an instruction from the on-board device 110.

The on-board device 110 communicates with the user terminal 200, so that it performs user authentication, gets a consent to pick up an image, makes an instruction for picking up an image, obtains a picked-up image, etc. The on-board device 110 transmits the image obtained from the user terminal 200 to the management server 300. The on-board device 110 also carries out the control for outputting an advertisement from the user terminal 200.

The management server 300 is a server for managing the vehicle 100. In this embodiment, the on-board device 110 transmits the picked-up image taken by the user terminal 200 to the management server 300. The management server 300 may have a function to provide the on-board device 110 with advertisement information to be presented from the user terminal 200.

(Device Configuration)

Figure 2A:
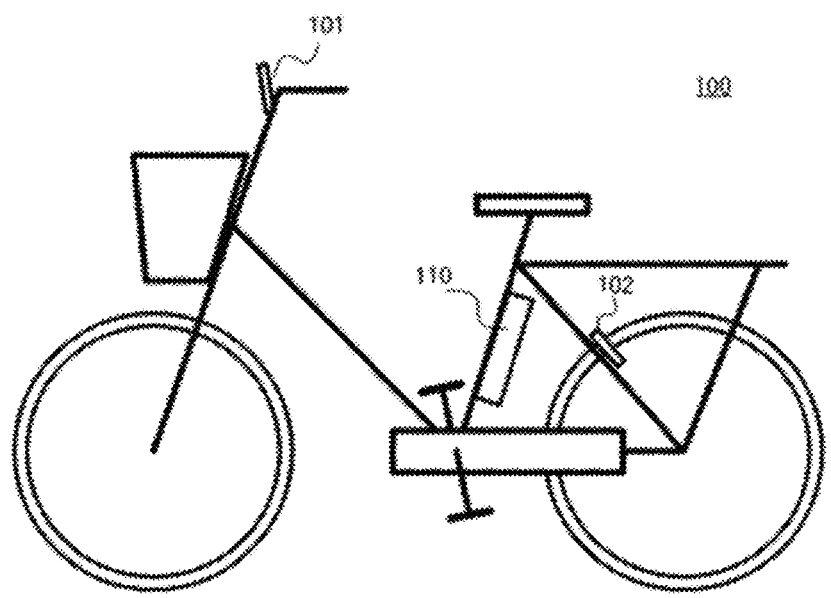
FIGS. 2A, 2B are views illustrating the configuration of a vehicle in the one embodiment.
Figure 2B:
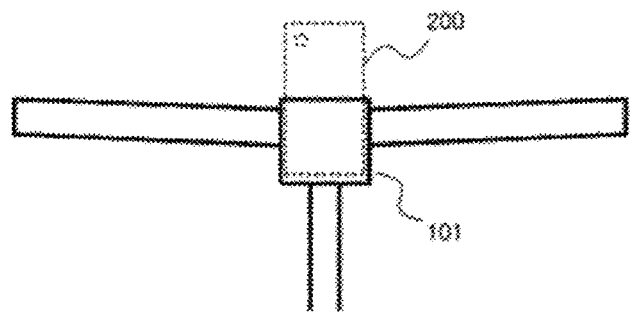

FIG. 2A and FIG. 2B are views illustrating the configuration of the vehicle (bicycle) 100. FIG. 2A is a side elevation of the vehicle 100, and FIG. 2B is an enlarged view looking at a handle part of the vehicle 100 from the front thereof. As illustrated in FIG. 2A, the vehicle 100 is provided with the terminal holding portion 101, an electronic lock 102, and the on-board device 110. The terminal holding portion 101 and the electronic lock 102 are respectively connected to the on-board device 110 by means of communication lines.

As illustrated in FIG. 2B, the terminal holding portion 101 is mounted on a front portion of the handle part, and serves to hold the user terminal 200. The terminal holding portion 101 is constructed to be capable of holding the user terminal 200, in such a manner that the user can visually recognize a display (display device 204) at a front face of the user terminal 200, and that a camera 203 on a back face of the user terminal 200 can pick up an image in a forward direction thereof. As long as constructed in this manner, the terminal holding portion 101 may be of a bottomed tubular structure, or may have a clamping mechanism. The terminal holding portion 101 may be arranged in an appropriate place other than the handle part, as long as it is capable of holding the user terminal 200 as well as picking up an image with the user terminal 200 held in place. In addition, the terminal holding portion 101 may be constructed to hold the user terminal 200 in such a manner that the user terminal 200 can pick up an image in a direction other than in the forward direction of the vehicle 100. Moreover, it may be constructed such that the direction of the terminal holding portion 101 can be controlled by the on-board device 110 so as to pick up an image in an arbitrary direction according to an instruction from the on-board device 110.

The terminal holding portion 101 may be provided with a wired cable (e.g., a USB cable) through which the user terminal 200 can communicate with the on-board device 110 or receive the supply of electric power from the on-board device 110, or may be provided with a terminal for insertion of the cable. The terminal holding portion 101 may also be provided with an antenna in order to perform short distance communication (non-contact communication) with or wireless power supply to the user terminal 200.

The electronic lock 102 performs locking and unlocking according to an instruction from the on-board device 110.

Figure 3:
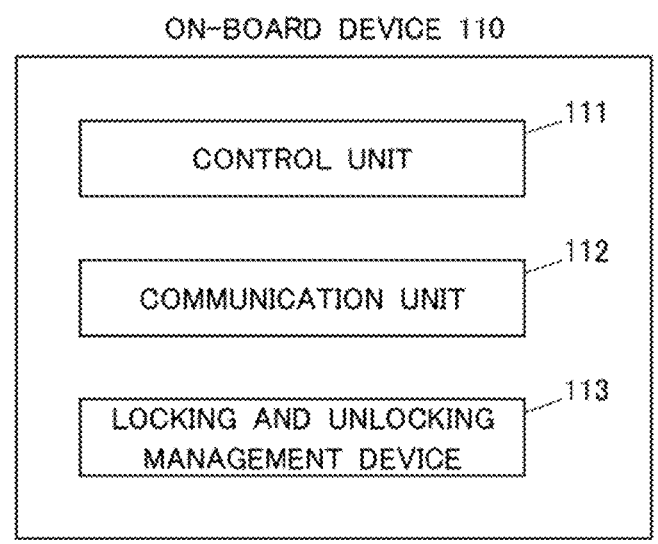
FIG. 3 is a block diagram illustrating the functional configuration of an on-board device in the one embodiment.

The on-board device 110 is provided with a control unit 111, a communication unit 112, and a locking and unlocking management device 113, as illustrated in FIG. 3. The control unit 111 is a computer (information processing device) which is composed of a processor, a main storage unit, an auxiliary storage unit, etc., and manages the overall control of the vehicle 100. The communication unit 112 performs communication between itself and the user terminal 200, and communication between itself and the management server 300. The communication unit 112 may be compatible with a plurality of communication methods or systems, e.g., may perform cable (wired) communication or short distance communication with the user terminal 200, and may also perform relatively long distance wireless communication with the management server 300. As the short distance communication, there can be exemplified near field type wireless communication (NFC), Bluetooth (registered trademark), ZigBee or the like, and as the relatively long distance wireless communication, there can be exemplified 3G, 4G, LTE, wireless LAN or the like. The vehicle 100 has a power supply device that serves to supply electric power to the on-board device 110. The vehicle 100 may be provided with a charging device that serves to convert the rotation of a pedal into electric power thereby to charge the power supply device with the electric power.

Figure 4:
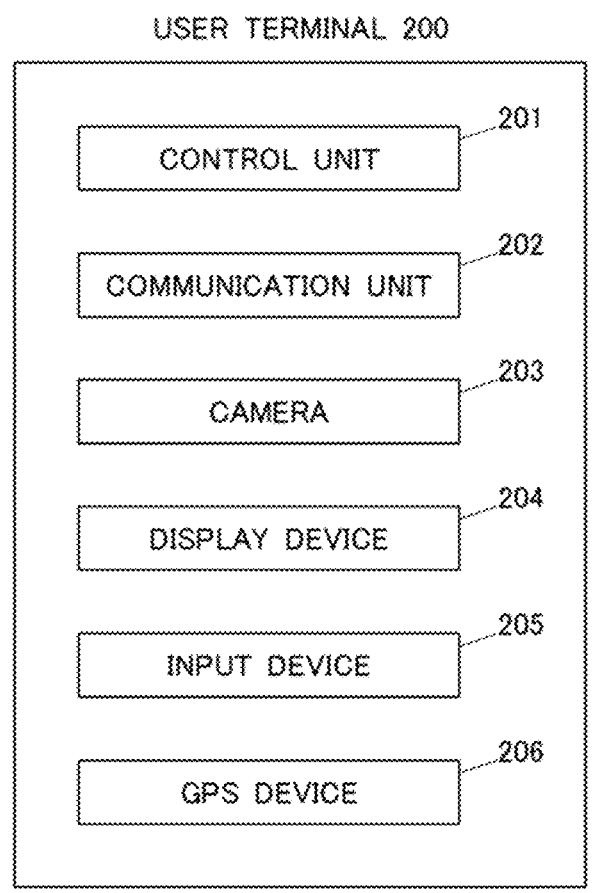
FIG. 4 is a block diagram illustrating the functional configuration of a user terminal in the one embodiment.

FIG. 4 is a view illustrating the configuration of the user terminal 200. The user terminal 200 is a personal digital assistant (mobile terminal) that can be carried by the user, and is provided with a control unit 201, a communication unit 202, a camera 203, a display device 204, an input device 205, and a GPS device 206. The control unit 201 is a computer (information processing device) which is composed of a processor, a main storage unit, an auxiliary storage unit, etc., and manages the overall control of the user terminal 200. The communication unit 202 performs communication between itself and the on-board device 110 or other devices. The communication method or system of the communication unit 202 is not limited in particular. The communication unit 202 can adopt cable (wired) communication and wireless communication, as mentioned above. The camera 203 is arranged on the back face of the user terminal 200, for example. The camera 203 may be arranged on the front face of the user terminal 200. The camera 203 may pick up only a still image, or may pick up both a still image and a video or moving image. Here, note that in this embodiment, the user terminal 200 has a flat plate-like shape, and is provided at its front face side with the display device 204 such as a liquid crystal display or the like, and the input device 205 such as a touch panel or the like. The GPS device 206 receives a satellite signal from a GPS communication satellite, and obtains location information.

The management server 300 is a computer (information processing device) that is provided with a control unit, a communication unit, and an input and output unit. The management server 300 carries out the status management of the vehicle 100, and the management of user's registration. The management server 300 may carry out the processing of distributing advertisement information to the on-board device 110. In addition, the management server 300 need not be composed of one computer, but may be composed of a plurality of computers.

The control unit of each of the above-mentioned individual devices is composed of a processor such as a CPU, a DSP or the like, a main storage unit such as a read-only memory (ROM), a random-access memory (RAM) or the like, and an auxiliary storage unit such as an EPROM, a hard disk drive (HDD), a removable medium or the like. Here, note that the removable medium is, for example, a flash memory such as a USB memory, an SD card or the like, or a disk recording medium such as a CD-ROM, a DVD disk, a Blu-ray Disc or the like. An operating system (OS), various kinds of programs, various kinds of tables, etc., are stored in the auxiliary storage unit. The processor executes a program stored in the auxiliary storage unit by loading it to a working area of the main storage unit. By controlling each configuration (component) unit through the execution of the program, it is possible to achieve each functional unit which accomplishes a predetermined purpose, as will be described later. A part or all of the functional units, however, may be achieved by a hardware circuit(s) such as an ASIC, an FPGA, or the like. However, the control unit need not necessarily be achieved by a single physical configuration, but may be composed of a plurality of computers which mutually cooperate with one another.

(Processing Flow During Use of the Vehicle)

Figure 5:
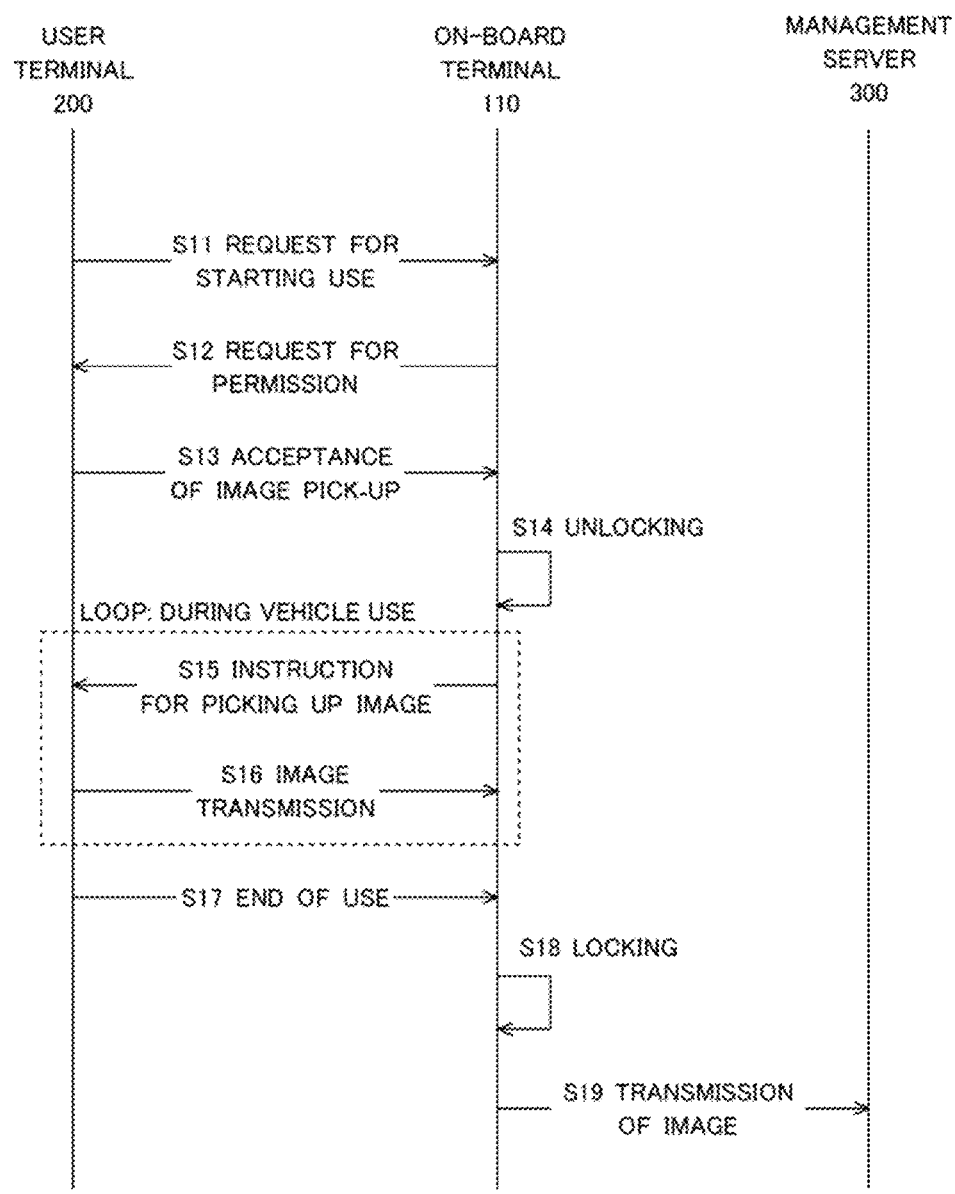
FIG. 5 is a sequence diagram at the time of using the vehicle in the one embodiment.
Figure 6:
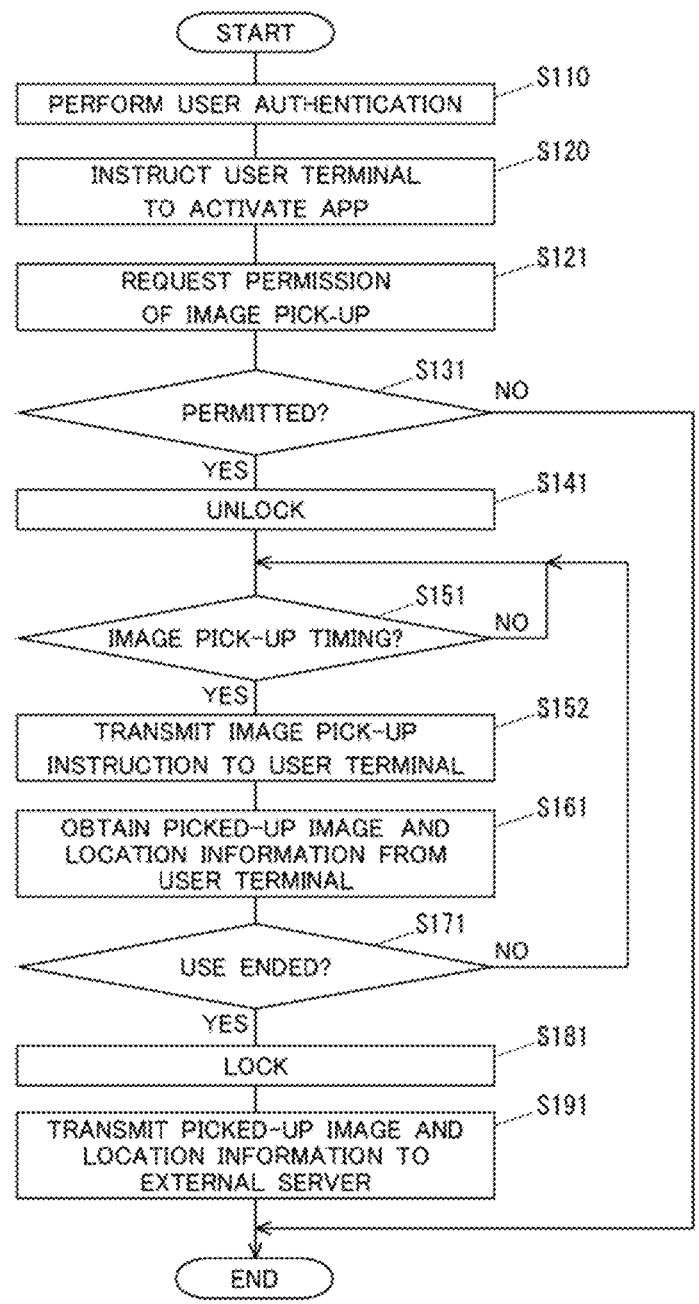
FIG. 6 is a flow chart illustrating the processing carried out by the on-board device at the time of using the vehicle in the one embodiment.

A flow of the processing at the time when the user uses the vehicle 100 will be explained with reference to FIG. 5 and FIG. 6. FIG. 5 is a sequence diagram illustrating exchanges between the individual devices, and FIG. 6 is a flow chart of the processing carried out by the on-board device 110.

Here, as a premise or precondition, the on-board device 110 of the vehicle 100 assumes that an app for using the vehicle 100 is installed in the user terminal 200, and authentication data for authenticating the user is stored in the user terminal 200.

Here, note that, in the following explanation, main components to perform processing are the control unit 111 of the on-board device 110 and the control unit 201 of the user terminal 200, but for the sake of simplification of the description, the on-board device 110 and the user terminal 200 will be referred to as the main components for the processing.

In step S11 in FIG. 5, the user performs communication between the user terminal 200 and the on-board device 110, and makes a request for starting the use of the vehicle 100. Specifically, the user inserts or puts the user terminal 200 into the terminal holding portion 101 of the vehicle 100. With this, communication is performed through near field wireless communication between the user terminal 200 and the on-board device 110, for example. The user terminal 200 transmits the authentication data stored in advance to the on-board device 110. The on-board device 110 authenticates the received authentication data (step S110 in FIG. 6). When the authentication is succeeded, the processing (routine) goes to the next processing.

In step S12 in FIG. 5, the on-board device 110 requests to the user terminal 200 the consent to pick up an image using the user terminal 200. Specifically, the on-board device 110 makes an instruction for activating the app to the user terminal 200 (step S120 in FIG. 6), as well as an instruction for asking the user's consent on the app to the user terminal 200 (step S121). The user terminal 200 activates the app, and displays a screen for asking the user's consent to pick up an image, in response to these instructions.

In step S13 in FIG. 5, the user terminal 200 transmits a result of an answer inputted by the user to the on-board device 110. The on-board device 110 determines whether the answer result obtained from the user is to consent to pick up an image (step S131 in FIG. 6). When the answer is to consent to pick up an image (YES in step S131), the routine goes to the following step S14 (S141), whereas when the answer is to not consent to pick up an image (NO in step S131), the routine is ended.

Here, note that in this embodiment, the user's consent to pick up an image is obtained at the time of starting to use the vehicle 100 and after the end of the authentication processing, but the timing of obtaining the user's consent to pick up an image may be arbitrary. For example, the user terminal 200 may ask the user for the user's consent to pick up an image before transmission of authentication data, and transmit the authentication data to the on-board device 110 when the user's consent is obtained. Alternatively, the user's consent to pick up an image may be obtained at the time of user's registration or installation of the app. In this case, it is not necessary to obtain the user's consent each time the user uses the vehicle 100, and the on-board device 110 can grasp that the user's consent to pick up an image has been obtained, at the time when the on-board device 110 has become able to communicate with the app of the user terminal 200.

In step S14 in FIG. 5 (step S141 in FIG. 6), the on-board device 110 unlocks the electronic lock 102. By the unlocking of the electronic lock 102, the user becomes able to use the vehicle 100. That is, the processing of step S14 can be is considered to be processing for making the vehicle 100 available.

While the user is using the vehicle 100, the image pick-up instruction from the on-board device 110 to the user terminal 200 (step S15 in FIG. 5), and the obtainment of an image (and location information) in the user terminal 200 and the transmission thereof to the on-board device 110 (step S16) are carried out in a repeated manner. Specifically, the on-board device 110 determines whether an image pick-up timing has been reached (step S151 in FIG. 6), and when it is the image pick-up timing, an image pick-up instruction for instructing to pick up an image is transmitted to the user terminal 200 (step S152). Here, note that, in this embodiment, it is assumed that picking up an image is carried out once for every 10 seconds, but an image pick-up interval may be decided in an appropriate manner, and an image pick-up frequency may also be lower or higher than this (once for every 10 seconds). When receiving the image pick-up instruction, the user terminal 200 carries out the picking up of an image using the camera 203, and the obtainment of location information from the GPS device 206, and transmits picked-up image data and location information data to the on-board device 110. The picking up of an image and the obtainment of location information are carried out substantially at the same timing so that the location information represents one at the time of picking up the image. In step S161, the on-board device 110 obtains the picked-up image data and the location information data from the user terminal 200, and stores them in the storage unit by associating these data with image pick-up time data. Here, note that the location information data obtained by the GPS device 206 of the user terminal 200 is used, but the location information may be obtained from the GPS device possessed by the on-board device 110.

The on-board device 110 may obtain, from the user terminal 200, direction information indicating an image pick-up direction (or a direction in which the user terminal 200 faces), in addition to the location information at the time of picking up an image.

The on-board device 110 determines whether the composition (or layout) of the image obtained from the user terminal 200 satisfies a predetermined condition (composition), and in cases where it does not satisfy the predetermined condition, the on-board device 110 may notify this to the user through the app of the user terminal 200, so that the user can adjust the arrangement position and direction of the user terminal 200. As the predetermined condition (composition), there can be mentioned, for example, that the image pick-up direction faces in the direction of movement of the vehicle 100, or the image pick-up direction faces substantially in the horizontal direction.

The image pick-up processing in the above-mentioned steps S15-S16 in FIG. 5 is carried out in a repeated manner, while the user is using the vehicle 100.

In the case of ending the use of the vehicle 100, in step S17 in FIG. 5, the user transmits a use end notice from the user terminal 200 to the on-board device 110 by operating the user terminal 200. In the case of receiving the use end notice from the user terminal 200 (YES in step S171 in FIG. 6), the on-board device 110 escapes from the loop of the image pick-up processing.

In step S18 in FIG. 5 (step S181 in FIG. 6), the on-board device 110 locks the electronic lock 102.

In step S19 in FIG. 5 (step S191 in FIG. 6), the on-board device 110 transmits a series of the picked-up image data picked up during the use of the vehicle 100 and the corresponding location information data and time data to the management server 300 through a communication unit 107. The management server 300 having obtained the picked-up image data may use this information in any manner. For example, the management server 300 can make an analysis about what kinds of persons are walking on pedestrian sidewalks in which time zones, or can detect special events.

In this embodiment, the picked-up image data is transmitted to the on-board device 110 each time an image is picked up in the user terminal 200, and after the end of the use of the vehicle 100, the picked-up image data thus accumulated is transmitted from the on-board device 110 to the management server 300 collectively or in a lump. However, a specific method for achieving this is not limited to the above-mentioned one, as long as the picked-up image data picked up by the user terminal 200 can finally be transmitted to the management server 300. For example, whenever the user terminal 200 picks up an image, image data thus picked up may be transmitted to the management server 300. Here, note that the picked-up image data need not be transmitted from the on-board device 110 to the management server 300, but instead, the user terminal 200 may directly transmit the picked-up image data to the management server 300. As another method, the picked-up image data may be accumulated in the on-board device 110, and may be transmitted from the on-board device 110 to the management server 300 at a predetermined timing. As an example of the predetermined timing, there is mentioned a time point which has been set in advance, or a time after the end of a plurality of uses of the vehicle.

(Advertisement Presentation Processing)

Figure 7:
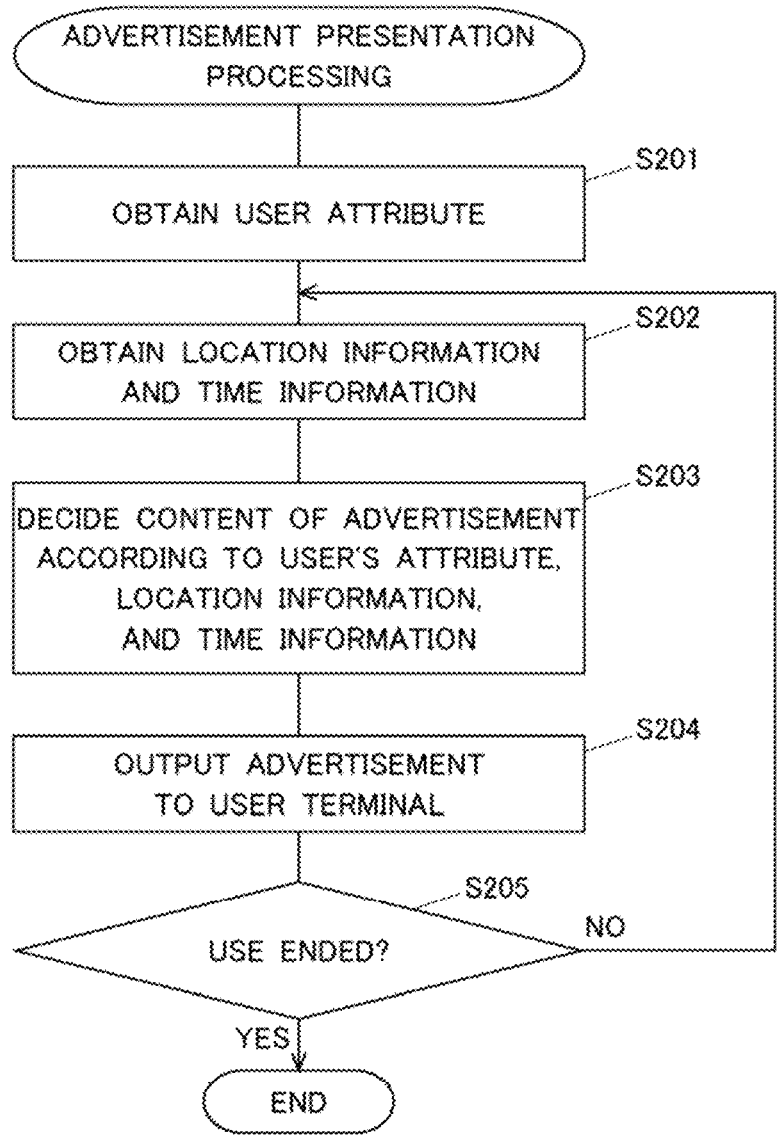
FIG. 7 is a flow chart illustrating the advertisement presentation processing carried out by the on-board device in the one embodiment.

In this embodiment, an advertisement may be outputted from the user terminal 200 during the use of the vehicle 100. A flow of advertisement presentation processing carried out by the on-board device 110 will be explained with reference to FIG. 7.

In step S201, the on-board device 110 obtains an attribute of the user. The on-board device 110 can specify the user in the authentication processing at the time of starting the use of the vehicle 100 (step S110 in FIG. 6), and hence, need only obtain a user attribute associated with the user. For example, the on-board device 110 can access the management server 300, and obtain the user attribute of the user. Alternatively, the user attribute may be obtained from the user terminal 200.

As the user attribute, there can be exemplified the age, sex, occupation, hobby, preference, or the like, of the user. In addition, an action history (e.g., a browsing history in SNS, a video site, or a news web site), an action tendency, etc., of the user on the Internet is included in the user attribute.

In step S202, the on-board device 110 obtains current location information and time information. The location information and the time information may be obtained from the user terminal 200, or may be obtained by the on-board device 110 itself.

In step S203, the on-board device 110 decides an advertising content to be presented to the user according to the user attribute, the location information and the time information. In this embodiment, it is assumed as follows: the user terminal 200 has stored in advance advertisement information to be distributed; a location range and a time to be distributed are specified in each piece of the advertisement information; and in addition, a genre is associated with each piece of the advertisement information. The on-board device 110 decides, as an advertisement to be presented to the user, an advertisement of which a distribution condition matches a current location and time point, and of which a genre matches the attribute of the user. Here, note that in cases where a plurality of advertisements satisfy such conditions, an appropriate selection should just be made.

Here, note that in this embodiment, an example has been explained in which the advertisement information to be presented is selected from the advertisement information which has been stored in the on-board device 110 in advance, but the advertisement information to be presented may be decided according to other methods. For example, the on-board device 110 may transmit a request for advertisement information including the attribute of the user, location information and time information to the management server 300, and receive the advertisement information selected in the management server 300.

In step S204, the on-board device 110 instructs the user terminal 200 to output the advertisement information decided in step S203. Here, note that the output of the advertisement information may be carried out by sound or voice, or may be carried out by image.

In step S205, the on-board device 110 determines whether the use of the vehicle by the user has ended, and when not ended, a return is made to step S202. Here, note that update processing of the advertisement to be presented may be carried out at a predetermined timing. In cases where the use of the vehicle by the user has ended, the on-board device 110 terminates the advertisement presentation processing.

Although the advertisement in this embodiment is intended for the user, i.e., the user of the vehicle 100, an advertisement may be outputted for the people existing in the surroundings of the vehicle 100. In this case, because the surrounding people can not see the display of the user terminal 200, it is considered that an advertisement is outputted by voice or sound. Alternatively, an advertisement may be outputted from a display device or an audio or voice output device which is mounted on the vehicle 100, instead of from the user terminal 200. As examples of the display device, there can be exemplified a liquid crystal display and a display device which is composed of a plurality of LED bars mounted on a vehicle wheel, and which is configured to display image and/or video by controlling the emission of light in accordance with the rotation of the wheel. In addition, in cases where an advertising voice or sound is outputted, it is inaudible or difficult to hear when a plurality of vehicles 100 produce outputs at individual timings, and hence, any one among the plurality of the vehicles 100 existing in the surroundings may be made to be a leader vehicle, so that it can decide the output content and the output timing of an advertisement, and give instructions to the other vehicles. Alternatively, only the leader vehicle may be made to output the advertisement. Communication among the vehicles 100 may be carried out directly, or may be carried out through the management server 300.

Here, note that in cases where an advertisement is presented for the surrounding people, an advertising content may be decided in consideration of location information and time information, without taking the attribute of the user into consideration. Alternatively, an image picked up by the user terminal 200 may be analyzed, and the attribute of a person existing in the surroundings may be estimated by image recognition processing, whereby an advertisement corresponding to the person's attribute may be selected. This processing may be carried out by the on-board device 110, or may be carried out by the management server 300. In cases where this processing is carried out by the management server 300, a vehicle of a user who picks up an image used for deciding an advertising content, and a vehicle to which an advertisement is outputted are not necessarily the same.

Advantageous Effects of this First Embodiment

According to this first embodiment, the picking up of an image is carried out by using the camera 203 of the user terminal 200, and so, images can be collected even if no camera is mounted on the vehicle 100. That is, the production cost and the maintenance cost of the vehicle 100 can be reduced. In addition, because the vehicle 100 is a bicycle, there is an advantage that an object such as for example a pedestrian, a thing on a sidewalk or the like, which is difficult to be picked up by a camera mounted on an automobile, can be picked up by the camera 203 of the user terminal 200. Moreover, a company or business operator can get advertising revenue by outputting an advertisement during the use of the vehicle 100. On the other hand, the user can use the vehicle 100 for free, when agreeing to pick up an image by means of the user terminal 200.

Second Embodiment

In the above-mentioned first embodiment, it is assumed that the user can use the vehicle 100 free of charge, but in this second embodiment, a fee is charged for the use of the vehicle 100. In addition, in this second embodiment, a registered user can use the vehicle 100, even if not consenting to pick up an image by the use of the user terminal 200.

In this second embodiment, the on-board device 110 requests accounting processing after the end of the use of the vehicle 100 by the user. In this case, an amount of charge is changed between a case where the user has consented to pick up an image by the use of the user terminal 200, and a case where the user has not consented. For example, in cases where the user has not consented to pick up an image, the amount of charge in this embodiment is set to a regular fee, whereas in cases where the user has consented, it is set to an amount of money discounted from the regular fee. Here, note that in cases where the user has consented to pick up of an image, no charge may be made for the use of the vehicle 100 by the user.

In addition, an inquiry may be made to the user as to whether or not to consent to the output of an advertisement, and only in cases where the user consents, the advertisement may be outputted. In this case, the on-board device 110 may also make the amount of charge lower when the user has consented the advertisement output, as compared with the case when the user has not consented the advertisement output.

Other Embodiments

The above-mentioned embodiments are only some examples, and the present disclosure can be implemented while being changed or modified suitably without departing from the spirit and scope of the disclosure.

In the above-mentioned explanation, the moving object, which is a target for sharing, is a bicycle, but an arbitrary moving object may also be a sharing target. As the moving object being a target for sharing, there can be mentioned a vehicle, a flying object, or a marine vessel. The vehicle may be, or may not be, powered. As some examples of the vehicle for sharing, there can be mentioned a motor vehicle (automobile), a motorcycle, a motorized bicycle (or a bicycle with a prime mover), an electric assist bicycle, a bicycle (with no power), an electric wheelchair, a standing ride type electric vehicle (electric standing vehicle), a rickshaw, a baby carriage (stroller), a shopping cart, a carry cart, and so on.

Although in the above-mentioned embodiments, the vehicle is made available by unlocking the electronic lock, the vehicle may also be made available by other techniques. For example, there can be considered various techniques such as activating the vehicle, enabling the vehicle to be activated, enabling the user to access a device or data for activating the vehicle, and so on.

In cases where a plurality of users get on the moving object, whether which advertisement suited to the preference of which user is presented may be decided as appropriate. For example, in a baby carriage (stroller), a rickshaw or the like, an advertisement according to the passenger's attribute may be outputted. Alternatively, advertisements with different contents may be presented to a driver (operator) and a fellow passenger, respectively. In addition, a video (moving images) or the like suited to a passenger's preference may be outputted, instead of outputting an advertisement. For example, in a shopping cart with a baby carriage, reproduction of a video for child (fellow passenger) and output of an advertisement for adult (operator) may be carried out.

Here, note that the processings, units and devices explained in this disclosure can be implemented in various combinations thereof, as long as technical inconsistency does not occur.

Moreover, the processing(s) explained as carried out by a single device may be carried out by a plurality of devices. Alternatively, the processing(s) explained as carried out by different devices may be carried out by a single device. In a computer system, whether each function of the disclosure is achieved by what kind of hardware configuration (server configuration) can be changed in a flexible manner.

The present disclosure can also be achieved by supplying a computer program which implements the functions explained in the above-mentioned embodiments to a computer, and by reading out and executing the program by means of one or more processors of the computer. Such a computer program may be supplied to the computer by a non-transitory computer readable storage medium which can be connected with a system bus of the computer, or may be supplied to the computer through a network. The non-transitory computer readable storage medium includes, for example, an arbitrary type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, an arbitrary type of medium suitable for storing electronic commands.

What is claimed is:

1. An on-board device mounted on a vehicle, the device comprising:
    a controller comprising at least one processor and associated memory configured to:
    transmit, to a mobile terminal that can be carried by a user, an instruction for obtaining permission of the user to pick up an image with a camera of the mobile terminal during use of the vehicle by the user; and
    if the permission of the user to pick up an image is obtained, execute a process for unlocking the vehicle to make the vehicle available to the user,
    wherein the controller is further configured to:
        instruct the mobile terminal to pick up a plurality of images by using the camera in a repeated manner during use of the vehicle;
        obtain the images picked up by the camera of the mobile terminal;
        obtain location information on locations at which the images have been picked up with the camera; and
    transmit the images and the location information to an external server.

2. The on-board device as set forth in claim 1, wherein the controller is further configured to instruct the mobile terminal to output an advertisement from an output unit of the mobile terminal.

3. The on-board device as set forth in claim 2, wherein the controller is further configured to:
    obtain an attribute of the user of the mobile terminal; and
    decide a content of the advertisement to be outputted from the output unit according to the attribute of the user.

4. An information processing method performed by an on-board device mounted on a vehicle, the on-board device comprising a processor and associated memory, and the method comprising:
   transmitting, to a mobile terminal that can be carried by a user, an instruction for obtaining permission of the user to pick up an image with a camera of the mobile terminal during use of the vehicle by the user; and
   if the permission of the user to pick up an image is obtained, executing a process for unlocking the vehicle to make the vehicle available to the user,
   wherein the method further comprises:
      instructing the mobile terminal to pick up a plurality of images by using the camera in a repeated manner during use of the vehicle;
      obtaining the images picked up by the camera of the mobile terminal;
      obtaining location information on locations at which the images have been picked up with the camera; and
      transmitting the images and the location information to an external server.

5. A non-transitory storage medium which stores a program for causing an on-board device mounted on a vehicle to execute an information processing method, the on-board device comprising a processor and associated memory, and the information processing method comprising:
   transmitting, to a mobile terminal that can be carried by a user, an instruction for obtaining permission of the user to pick up an image with a camera of the mobile terminal during use of the vehicle by the user; and
   if the permission of the user to pick up an image is obtained, executing a process for unlocking the vehicle to make the vehicle available to the user,
   wherein the method further comprises:
      instructing the mobile terminal to pick up a plurality of images by using the camera in a repeated manner during use of the vehicle;
      obtaining the images picked up by the camera of the mobile terminal;
      obtaining location information on locations at which the images have been picked up with the camera; and
      transmitting the images and the location information to an external server.

6. A vehicle comprising:
   the on-board device as set forth in claim 1; and
   an electronic lock configured to lock and unlock the vehicle,
      wherein the controller executes the process for unlocking the vehicle by controlling the electronic lock.

7. The vehicle as set forth in claim 6, wherein the vehicle is a bicycle, an automobile, a motorcycle, a wheelchair, a standing ride type electric vehicle, a rickshaw, a stroller, a shopping cart, or a carry cart.

* * * * *